(12) United States Patent
Egidi et al.

(10) Patent No.: US 11,900,583 B2
(45) Date of Patent: Feb. 13, 2024

(54) METHOD FOR IDENTIFYING A STATE OF A FOOD PACKAGE BY USING A CAMERA, AND A DEVICE THEREOF

(71) Applicant: Tetra Laval Holdings & Finance S.A., Pully (CH)

(72) Inventors: Sara Egidi, Modena (IT); Gabriele Molari, Modena (IT); Federico Campo, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 17/907,071

(22) PCT Filed: Mar. 19, 2021

(86) PCT No.: PCT/EP2021/057074
§ 371 (c)(1),
(2) Date: Sep. 22, 2022

(87) PCT Pub. No.: WO2021/191072
PCT Pub. Date: Sep. 30, 2021

(65) Prior Publication Data
US 2023/0109094 A1    Apr. 6, 2023

(30) Foreign Application Priority Data
Mar. 23, 2020    (EP) .................................... 20164797

(51) Int. Cl.
*G06T 7/00*    (2017.01)
*G06T 7/73*    (2017.01)
*G06K 7/14*    (2006.01)

(52) U.S. Cl.
CPC .......... *G06T 7/0004* (2013.01); *G06K 7/1413* (2013.01); *G06K 7/1443* (2013.01); *G06T 7/73* (2017.01); *G06T 2207/30128* (2013.01)

(58) Field of Classification Search
CPC ... G06T 7/10; G06T 7/11; G06T 2207/30128; G06V 10/26; G06V 10/74; G06V 10/751;
(Continued)

(56) References Cited

U.S. PATENT DOCUMENTS

| 2005/0199645 A1 | 9/2005 | Sivertsen et al. |
| 2011/0186623 A1 | 8/2011 | Truesdale |

(Continued)

FOREIGN PATENT DOCUMENTS

| CN | 205 952 666 U | 2/2017 |
| CN | 110 599 248 A | 12/2019 |

(Continued)

OTHER PUBLICATIONS

International Search Report and Written Opinion in PCT Application No. PCT/EP2021/057074 dated Jun. 15, 2021 in 12 pages.

(Continued)

*Primary Examiner* — Andrew W Johns
(74) *Attorney, Agent, or Firm* — Knobbe, Martens, Olson & Bear, LLP (57) ABSTRACT

A method for identifying a state of a food package by using a camera can include capturing image data depicting a section of the food package by using the camera. The section includes at least one package feature, The method can further include identifying a package feature sub-set of the image data depicting the at least one package feature provided in the section, and determining the state of the food package based on the package feature sub-set of the image data. The state is selected from a food holding state and an emptied state.

11 Claims, 8 Drawing Sheets

(58) Field of Classification Search
CPC .... G06V 10/764; G06V 10/768; G06V 20/68; G06K 7/1417; G06K 7/1443
See application file for complete search history.

(56) References Cited

U.S. PATENT DOCUMENTS

| | | |
|---|---|---|
| 2013/0075296 A1 | 3/2013 | Ramsey et al. |
| 2014/0257959 A1 | 9/2014 | Chung |
| 2019/0251522 A1 | 8/2019 | Wallis |
| 2020/0065534 A1 | 2/2020 | Hayashi et al. |

FOREIGN PATENT DOCUMENTS

| | | |
|---|---|---|
| WO | 2014/053499 A1 | 4/2014 |
| WO | WO-2021/191071 A1 * | 9/2021 |

OTHER PUBLICATIONS

European Search Report in EP Application No. 20164797.1 dated Sep. 2, 2020 in 8 pages.
International Search Report and Written Opinion in PCT Application No. PCT/EP2021/057073 dated May 21, 2021 in 12 pages.
European Search Report in EP Application No. 20164799.7 dated Sep. 20, 2011 in 9 pages.

* cited by examiner

METHOD FOR IDENTIFYING A STATE OF A FOOD PACKAGE BY USING A CAMERA, AND A DEVICE THEREOF

TECHNICAL FIELD

The invention relates to packaging technology. More particularly, it is related to a method for identifying a state of a food package by using a camera, and a device thereof.

BACKGROUND ART

Today, many consumers want to recycle empty packages and to facilitate recycling different technologies have been developed. For instance, deposit machines for PET bottles and Aluminum cans are widespread, and well known for consumers in many countries. A general principle of these machines is to identify a type of package, for instance by reading a bar code on the package, and if the type is one of a number of predetermined types of packages, remuneration is provided in the form of a paper slip. A consumer may then in a next step go to a check out desk and exchange the paper slip for money.

Even though current technology fulfil its purpose for some types of packages, there are packages for which the technology is not suitable, and hence these packages have to be handled differently or in some cases not be part of the recycling remuneration program. Another problem with current technologies is that to provide the remuneration program, non-negligible investments in hardware are needed.

SUMMARY

It is an object of the invention to at least partly overcome one or more of the above-identified limitations of the prior art. In particular, it is an object to provide a method enabling cost-efficient and versatile recycling of packages.

According to a first aspect it is provided a method for identifying a state of a food package by using a camera, said method comprising capturing image data depicting a section of the food package by using the camera, wherein the section comprises at least one package feature, identifying a package feature sub-set of the image data depicting the at least one package feature provided in the section, and determining the state of the food package based on the package feature sub-set of the image data, wherein the state is selected from a food holding state and an emptied state.

An advantage with identifying whether the package is in the food holding state or in the emptied state is that this may provide for cost-efficient recycling since e.g. a camera equipped mobile phone can be used for determining the state of the package.

The section may further comprise a printed code, and said method may further comprise identifying an identification data sub-set of the image data depicting the printed code, determining identification data based on the identification data sub-set of the image data.

An advantage of having the identification data associated with the package is that by using this identification data information about a type of package and package features related to this type can be retrieved and taken into account when identifying the state.

The method may further comprise determining position data by using the device, transmitting the position data to a server, and storing the identification data, the state of the package and the position data on the server.

An advantage with having the position data is that fraud attempts may be discovered. For instance, in case the package is recycled far away from a place of retailer to which the package was shipped, this may be indication that it is a fraud attempt. Time data may also be used for this purpose, on its own or in combination with the position data.

The method may further comprise determining if the position data is within a recycling area.

An advantage with this is that the package may be considered recycled in case the package is identified to be in the emptied state and the position data is within the recycling area. By defining a recycling event like this and using e.g. a camera equipped mobile phone or a camera attached to a recycling bin, a cost-efficient recycling set up can be achieved.

The at least one package feature may comprise an opening device, and the emptied state may comprise that the opening device is in an opened state.

The at least one package feature may comprise at least one weakening line, and the emptied state may comprise that the package is in a flat-folded state.

The printed code may be a unique two-dimensional code.

An advantage of having the unique code is that each package can be traced and valuable learnings can be made from the knowledge gathered from following the packages, e.g. for improving distribution and logistics and also for identifying persons that may have been exposed to health risk if the package is, after being shipped, identified to hold a harmful food product.

The device may be associated with a user identity, and the method further comprising transmitting the user identity to the server, and storing the identification data, the state of the package and the user identity on the server.

The steps of capturing the image data depicting the section of the food package, identifying the identification sub-set of the image data, determining the identification data based on the identification sub-set, identifying the package feature sub-set of the image data depicting the opening device, and determining the state of the food package based on the package feature sub-set of the image data may be performed on the server.

Alternatively, the method may further comprise transmitting the identification data to the server, and receiving template data related to the identification data from the server, wherein the template data may be taken into account in the step of determining the state of the food package.

According to a second aspect it is provided a device configured to identify a state of a food package, said device comprising a camera configured to capture image data depicting a section of the food package, wherein the section comprises at least one package feature, a control circuit configured to execute a package feature identification function configured to identify a package feature sub-set of the image data depicting the at least one package feature, and a state determination function configured to determine the state of the food package based on the package feature sub-set of the image data, wherein the state is selected from a group consisting of a food holding state and an emptied state.

The same advantages as described above with respect to the first aspect also applies to this second aspect.

The section may further comprise a printed code, wherein the control circuit is further configured to execute an identification data identification function configured to identify an identification sub-set of the image data depicting the printed code, and an identification data determination function configured to determine identification data based on the first sub-set of the image data.

The device may be a camera equipped mobile device or a camera equipped bin.

According to a third aspect it is provided a server configured to identify a state of a food package, said server comprising a transceiver configured to receive image data depicting a section of the food package from a device, wherein the section comprises at least one package feature, a control circuit configured to execute a package feature identification function configured to identify a package feature sub-set of the image data depicting the at least one package feature, and a state determination function configured to determine the state of the food package based on the package feature sub-set of the image data, wherein the state is selected from a group consisting of a food holding state and an emptied state.

The same advantages as described above with respect to the first aspect also apply to this third aspect.

The section may further comprise a printed code, and the control circuit may further be configured to execute an identification data identification function configured to identify an identification data sub-set of the image data depicting the printed code, and an identification data determination function configured to determine identification data based on the identification data sub-set of the image data.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figures 1A, 1B, 2, 3A, 3B:
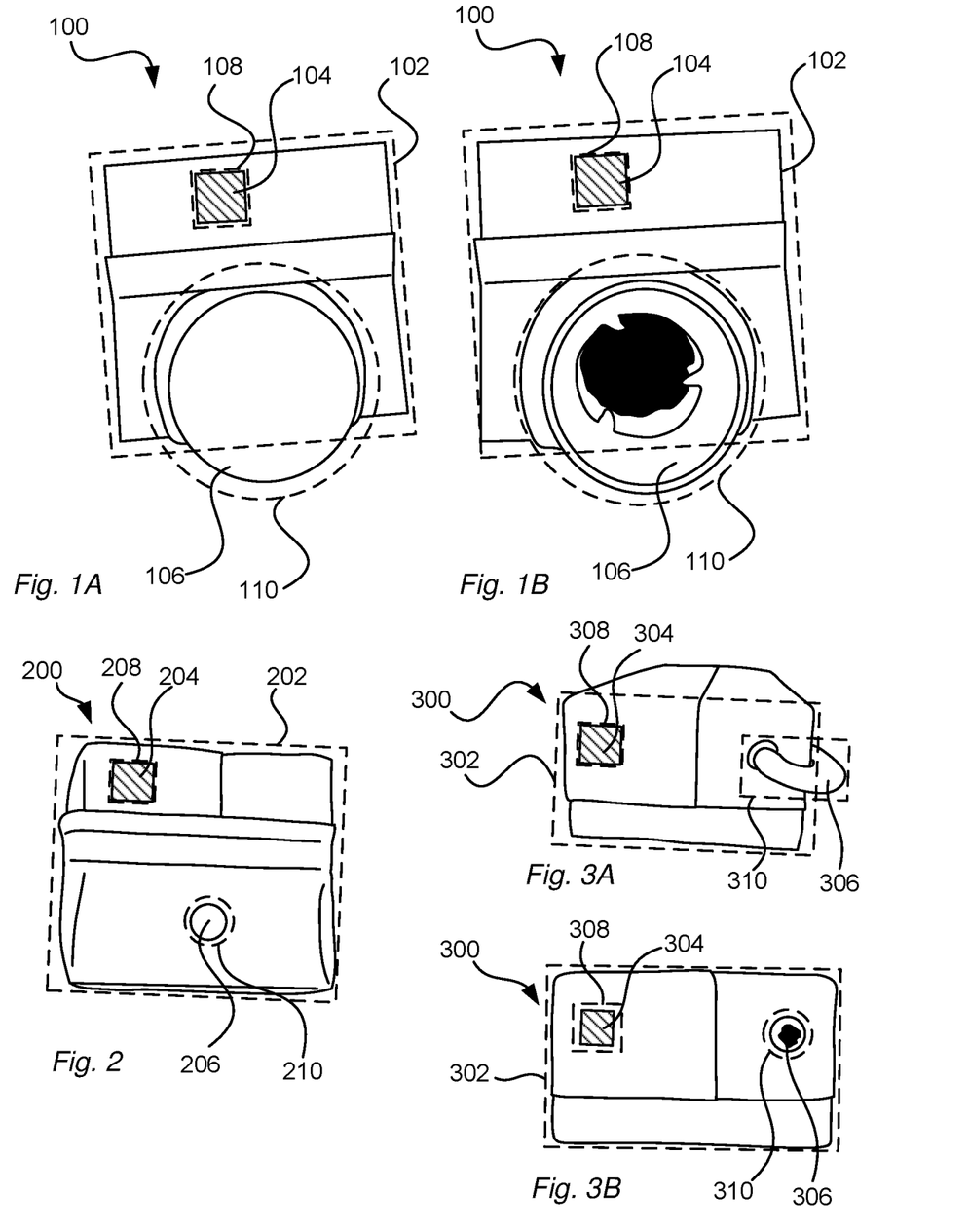
FIG. 1A is an example of image data depicting a top section of a package with a cap in place.
FIG. 1B is an example of image data depicting the top section also illustrated in FIG. 1A, but with the cap removed.
FIG. 2 is another example of image data depicting a top section of a package, but unlike the package illustrated in FIGS. 1A and 1B, the package is provided with a straw hole instead of the cap.
FIG. 3A is still another example of image data depicting a top section of a package with a straw hole, but unlike the package illustrated in FIG. 2, a straw is placed in the straw hole.
FIG. 3B illustrates the package illustrated in FIG. 3A, but with the straw removed from the straw hole, thereby leaving a punctured straw hole coverage.

FIG. 1A illustrates by way of example a package 100 comprising a section 102, herein a top section. The section 102 can, as illustrated, be provided with a printed code 104, herein in the form of a two-dimensional code, e.g. a QR code. Further, an opening device 106, herein a spout with a cap, can be provided. In image data depicting the package 100, the printed code 104 may be part of an identification data sub-set 108 of the image data, and the opening device 106 may be part of a package feature sub-set 110 of the image data.

The printed code 104 may be used for identifying the package 100, that is, the printed code may comprise a unique code that provides for that the package can be identified, which in turn provides for that the package can be traced throughout the life cycle of the package 100. The printed code 104 can be printed in various ways, for instance by using digital printing technology or by using an inkjet printer. Further the printed code may be achieved by embossing or in any other way effecting the material such that a code can be provided. To identify the package 100, the first sub-set of the image data 108 may be input to an image data processing software configured to read and interpret the printed code 104. Further, as an additional alternative, the printed code 104 may be produced such that this is not visible to the human eye, but to the camera.

The opening device 106 can be opened or closed. By using the package feature sub-set 110 of the image data, the image processing software can determine whether or not the package 100 is in an opened state, as illustrated by way of example in FIG. 1A, or in a closed state as illustrated by way of example in FIG. 1B. As illustrated, when having the opening device 106 embodied as the spout and cap, the opened state may be defined as that the cap is placed on the spout, and the closed state may be defined as that the cap is removed from the spout.

By having the first sub-set 108 and the second sub-set 110 being part of the image data, that is, capturing information about the printed code 104 and the opening device 106 at the same time, it is possible to conclude the state of the package 100 and also, in case the identification data sub-set 108 is available, an identity of the package.

FIG. 2 illustrates another example of a package 200 comprising a section 202, more particularly a top section as in FIGS. 1A and 1B. Also in line with FIGS. 1A and 1B, the package 200 can comprise a printed code 204 and an opening device 206. In the image data depicting the package 200, an identification data sub-set 208 can comprise image data related to the printed code 204 and a package feature sub-set 210 can comprise image data related to the opening device 210 in line with FIGS. 1A and 1B.

However, unlike the package 100 illustrated in FIGS. 1A and 1B, the opening device 206 of the package 200 illustrated in FIG. 2 is a straw hole and not the spout and cap arrangement illustrated in FIGS. 1A and 1B. Even though the opening device 206 in this example is the straw hole 206, it is still possible for the image processing software to determine whether this is in the opened state or in the closed state, which in turn may be used for determining the state of the package 200. If correctly assessed by the image processing software, the package 200 illustrated in FIG. 2 is in the closed state, which implies that the straw hole comprises an unbroken cover, that is, no straw is identified to have been pushed through the straw hole.

FIGS. 3A and 3B illustrate yet another example of a package 300 with a section 302. In line with the packages 100, 200 illustrated in FIGS. 1A, 1B and 2, the package 300 can comprise a printed code 304 and an opening device 306. An identification subset 308 of image data can comprise the printed code 304 and a package features subset 310 of the image data can comprise the opening device 306.

As in FIG. 2, the opening device 306 comprises the straw hole. However, unlike the package 200 illustrated in FIG. 2, the opening device 306 is in the opened state. FIG. 3A illustrates a situation where the straw has been pushed through the cover of the straw hole and thereafter has been left in the straw hole. FIG. 3B illustrates a different situation, which is also an example of the opened state, in which the straw has been pushed through the cover, but not left in the straw hole, thereby leaving a broken cover of the straw hole.

Figure 4:
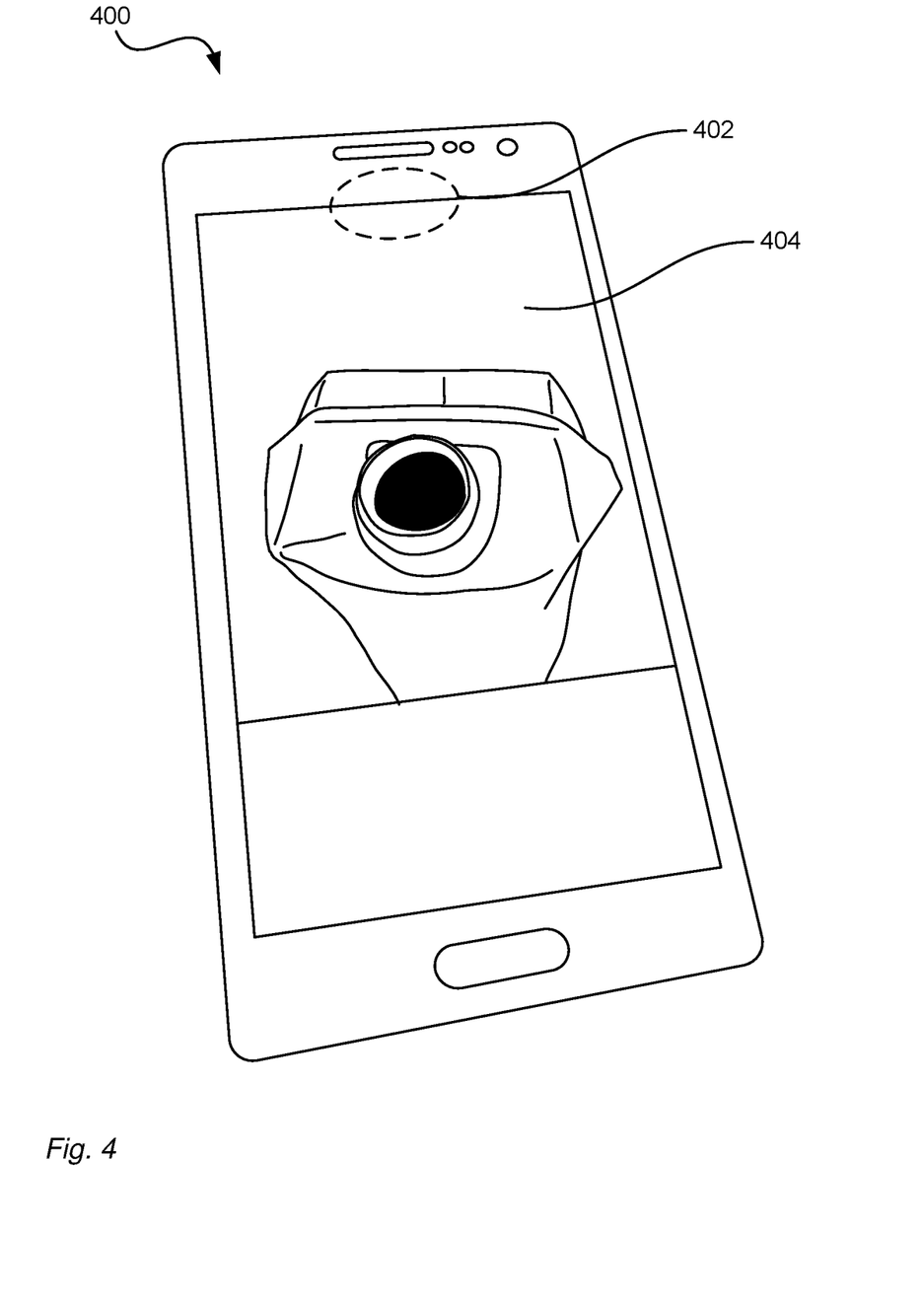
FIG. 4 illustrates a mobile device used for capturing image data depicting a package with a cap removed.

FIG. 4 illustrates by way of example a device 400 embodied as a mobile device 400 that can be used for capturing image data depicting a package with a cap removed. The mobile device 400, which may be a mobile phone, such as a smart phone, a tablet or any other electronic device fit for the purpose, can comprise a camera 402. In the example illustrated in FIG. 4, the camera 402 is a rear camera, that is a camera placed on the rear side of the mobile device. As illustrated, the mobile device 400 may, on a front side, comprise a display 404 presenting image data captured by the camera 402.

Figure 5A:
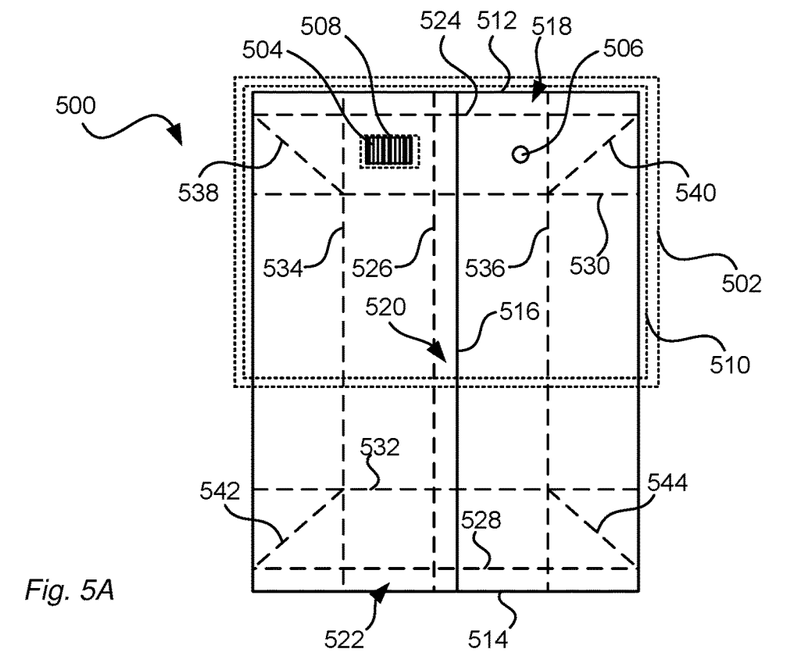
FIG. 5A illustrates another package in a flat-folded state.

FIG. 5A illustrates by way of example a flat-folded package 500. More particularly, the package 500 is an emptied carton package that is, when being in a food holding state, shaped as a parallelepiped. In this example a section 502 is covering a part of the flat folded package 500, more particularly part of a top section of the package 500 and part of side sections of the package. Further, the package comprises a printed code 504 and an opening device 506 in line with the examples provided in FIGS. 1A, 1B, 2, 3A and 3B.

An identification subset 508 of the image data depicting the package may comprise the printed code 304 in line with the examples presented above. A package feature subset 510 may however comprise not only the opening device 506, but also additional parts of the package 500 to cover additional package features. The opening device 506 may be one package feature that can be used for determining whether the package 500 is in an emptied state or in a food holding state. A top end line 512, a bottom end line 514, and a longitudinal sealing line 516 are examples of other package features that can be used for the same purpose. For instance, these lines can be compared with one another for determining, or identifying, the state of the package. Even though not illustrated a distance reference mark may be printed on the package 500 to enable the image processing software to reliably estimate lengths of the different lines.

In addition, a top transversal sealing area 518 can be used as one of the package features. In case this is placed in an uppermost part of the section 502, this may be an indication that the package 500 is flat folded. Similarly, a longitudinal sealing area 520 and a bottom transversal sealing area 522 can be used.

Weakening lines 524, 526, 528, 530, 532, 534, 536, 538, 540, 542, 544 (hereafter referred to as 524-544) can also form part of the package features. The weakening lines 524-544, also referred to as folding lines, may be areas of the package 500 in which packaging material has been compressed during production of the packaging material in order to facilitate folding of the package 500 in a filling machine. In an end of a life cycle of the package 500 these weakening lines 524-544 may also be used for identifying the state of the package, more particularly whether the package is in the food holding state or in the emptied state.

Although presented as different groups, the features can be used in combination to identify the state of the package. Further, for other types of packages, different features may be added or used.

Figure 5B:
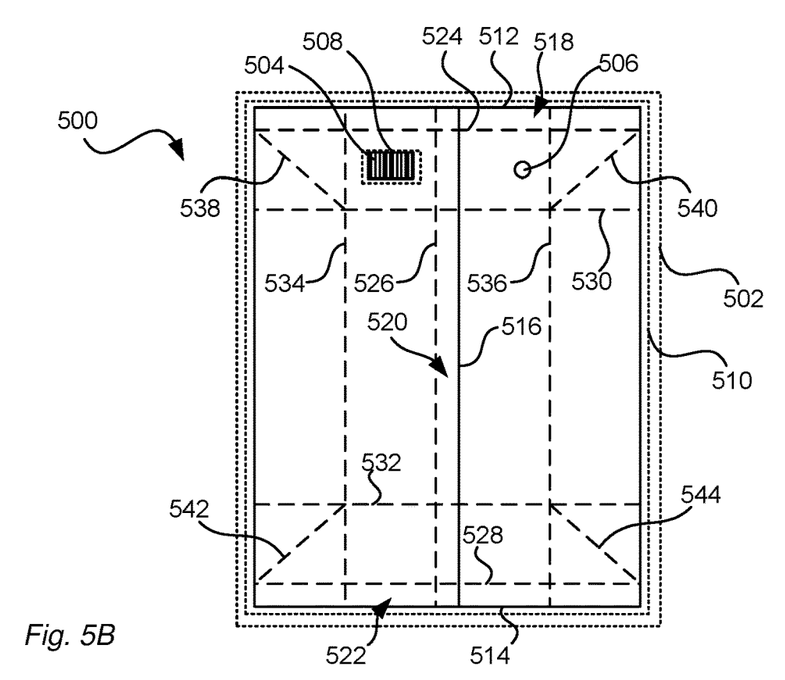
FIG. 5B illustrates the package also illustrated in FIG. 5A, but with image data covering a different section than in FIG. 5A.

FIG. 5B illustrates by way of example the package 500 as illustrated in FIG. 5A. However, instead of having the section 502 covering a part of the package 500 as illustrated in FIG. 5A, the section 502 covers the entire package 500. An advantage with having the package covering the entire package is that additional package features can be extracted and hence a more reliable identification of the state can be made.

Figure 6A:
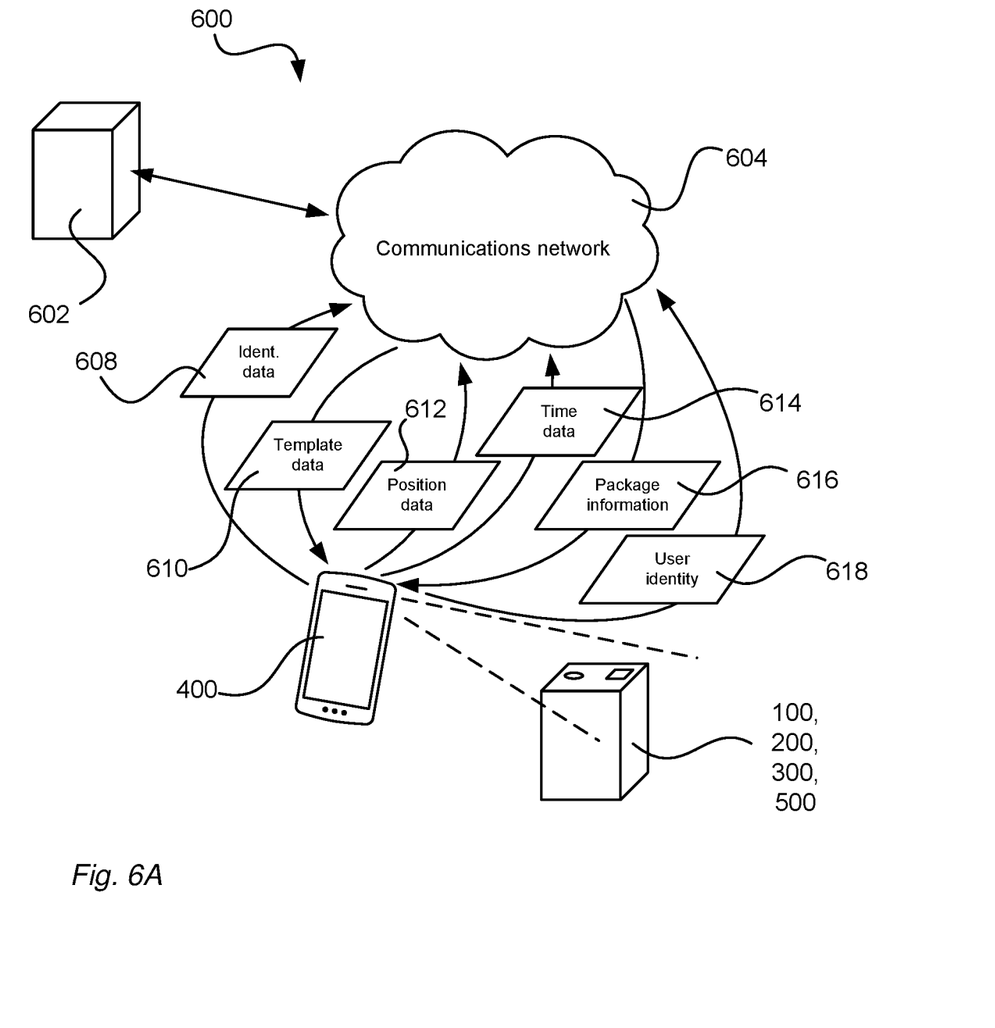
FIG. 6A schematically illustrates data exchange between the device and a server via a communications network according to a first set up example.

FIG. 6A schematically illustrates a system 600 for data exchange between the device, herein exemplified as the mobile device 400, and a server 602 via a communications network 604 according to a first set up example.

In this example, image data depicting the package 100, 200, 300, 500 illustrated in any of the FIG. 1A, 1B, 2, 3A, 3B, 5A or 5B can be captured by the device 400, and based on the image data of the identification data section 108, 208, 308, 508, which is related to the printed code, identification data 608 can be determined, that is, an identity of the package 100, 200, 300, 500 can be established. The identification data 508 can be transmitted from the mobile device 400 to the communications network 604 and from there to the server 602.

To determine whether the package 100, 200, 300, 500 is in the food holding state, that is, not yet consumed, or in the emptied state, that is, consumed and ready to be recycled, template data 610 may be transmitted from the server 602 via the communications network 604 to the mobile device 400. Since the identity of the package is established it is namely possible to retrieve information about the package 100, 200, 300, 500 from the server 602 or a database connected to the server 602 (not illustrated) about which kind of opening device the package is equipped with, how the opening device is placed in relation to the printed code, how the weakening lines are provided, width and length of the transversal sealing section as well as the longitudinal sealing section, etc. Hence, by having the template data 610 and feeding this into the image processing software, a more reliable and a faster assessment of the state of the package can be made.

In addition, position data 612 may be transmitted from the mobile device 400 to the server 602, that is, a position where the image data was captured. The position data 612 may be of interest to increase understanding of how the food product held in the package is consumed, which in turn may result in more efficient logistics and distribution.

The position data 612 may also be used to detect counterfeit products. For instance, if the position data 612 is far away from a retailer to which the package was shipped, this may be an indication that the package, and hence also the product, is not legit, and therefore, as a consequence, it may have been made to unduly collect recycling remuneration.

Time data 614 associated with the capture of the image data may also be transmitted from the device 400 to the server 602 via the communications network 604. In a similar manner as the position data 612, the time data 614 may be used to increase the understanding of consumer behaviors and/or to indicate a risk that the package is not legit.

Optionally, as an effect of that the package 100, 200, 300, 500 is identified, package information 616 may be transmitted from the server 602, or a database connected to the server 602, via the communications network 604 to the mobile device 400. The package information 616 may comprise information on material of the package such that this can be placed in a correct bin.

Further, since the mobile device 400 and/or the software application used for capturing the image data may be linked to a user identity, the user identity 618 can be transmitted from the mobile device 400 to the server 602 via the communications network 604. Having access to the user identity 618 provides additional possibilities to increase the understanding of the consumer behavior (even though this in some jurisdictions may require an acceptance by the user). Further, by having access to the user identity 618, it is possible to provide user-specific package information 616, e.g. a total number of packages recycled in a certain period of time.

Even though presented in a certain order, it should be understood that the data exchange can be made in different orders as well and also, if not related to one another, exchanged simultaneously.

Figure 6B:
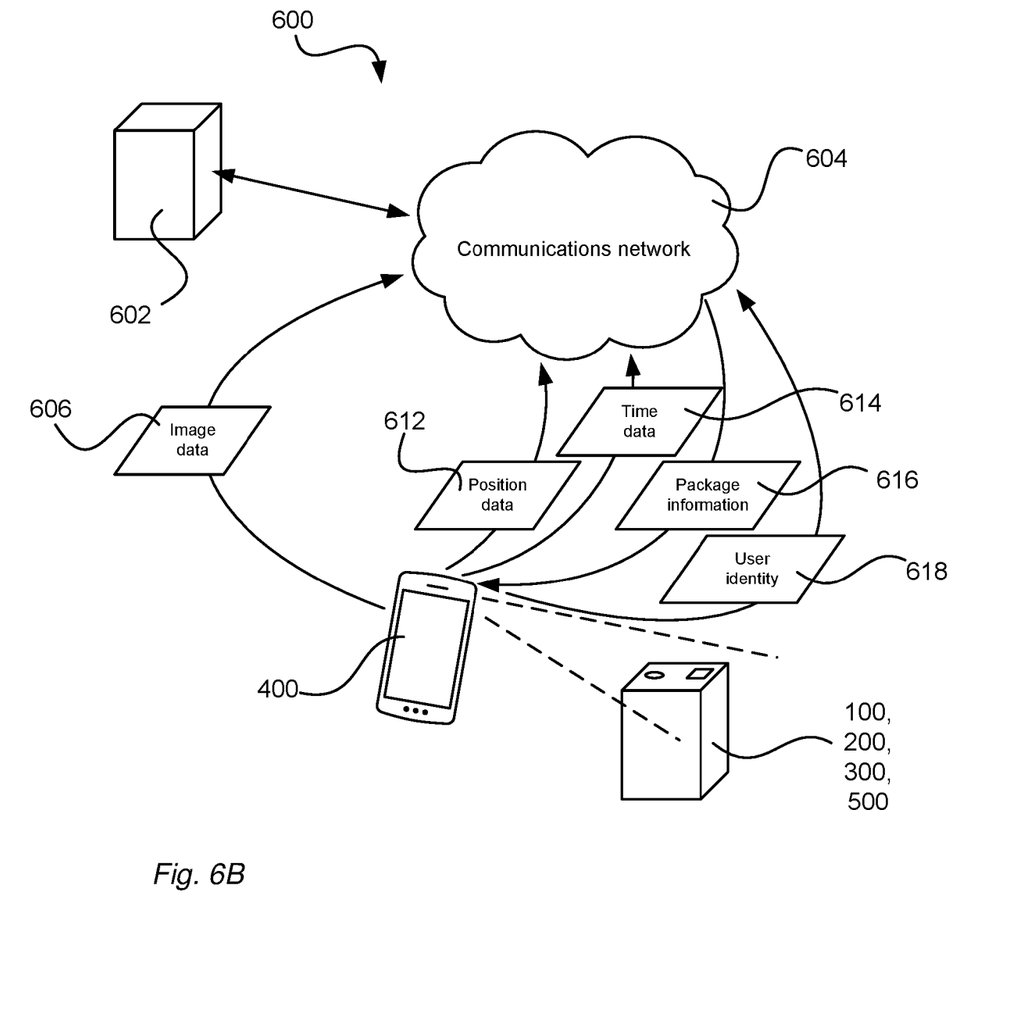
FIG. 6B schematically illustrates data exchange between the device and the server via the communications network according to a second set up example.

FIG. 6B illustrates data exchange between the mobile device 400 and the server via the communications network according to a second set up example.

Similar to the first set up example illustrated in FIG. 6A, the server 602 is communicatively connected to the mobile device 400 via the communications network 604. However, unlike the first set up example, in the second set up example image data 606 can be transmitted from the mobile device 400 to the server 602 via the communications network 604. In the server 602, based on the image data 606, identification data can determined. That is, instead of using the mobile device 400 for determining the identification data as in the first set up example illustrated in FIG. 6A, the mobile device 400 is solely used for capturing the image data 606 and transmitting this to the server 502 in which the identification data can be determined. Still an option, since determining the identification data may comprise a number of sub-steps is that part of a process for determining the identification data is made in the mobile device 400 and part of the process is made in the server 602.

In line with the first set up example illustrated in FIG. 6A, the position data 612 may be transmitted from the mobile device 400, which may be GPS equipped or NFC equipped, to the server 602. Further, also in line with the first set up example, the time data 614 may be transmitted from the mobile device 400 to the server 602. Still further and also in line with the first set up example, package information 616 may be transmitted from the server 602 via the communications network 604 to the mobile device 400. In addition, also in line with the first set up example, the user identity 618 may be transmitted from the mobile device 400 to the server 602 via the communications network 614.

Figure 7:
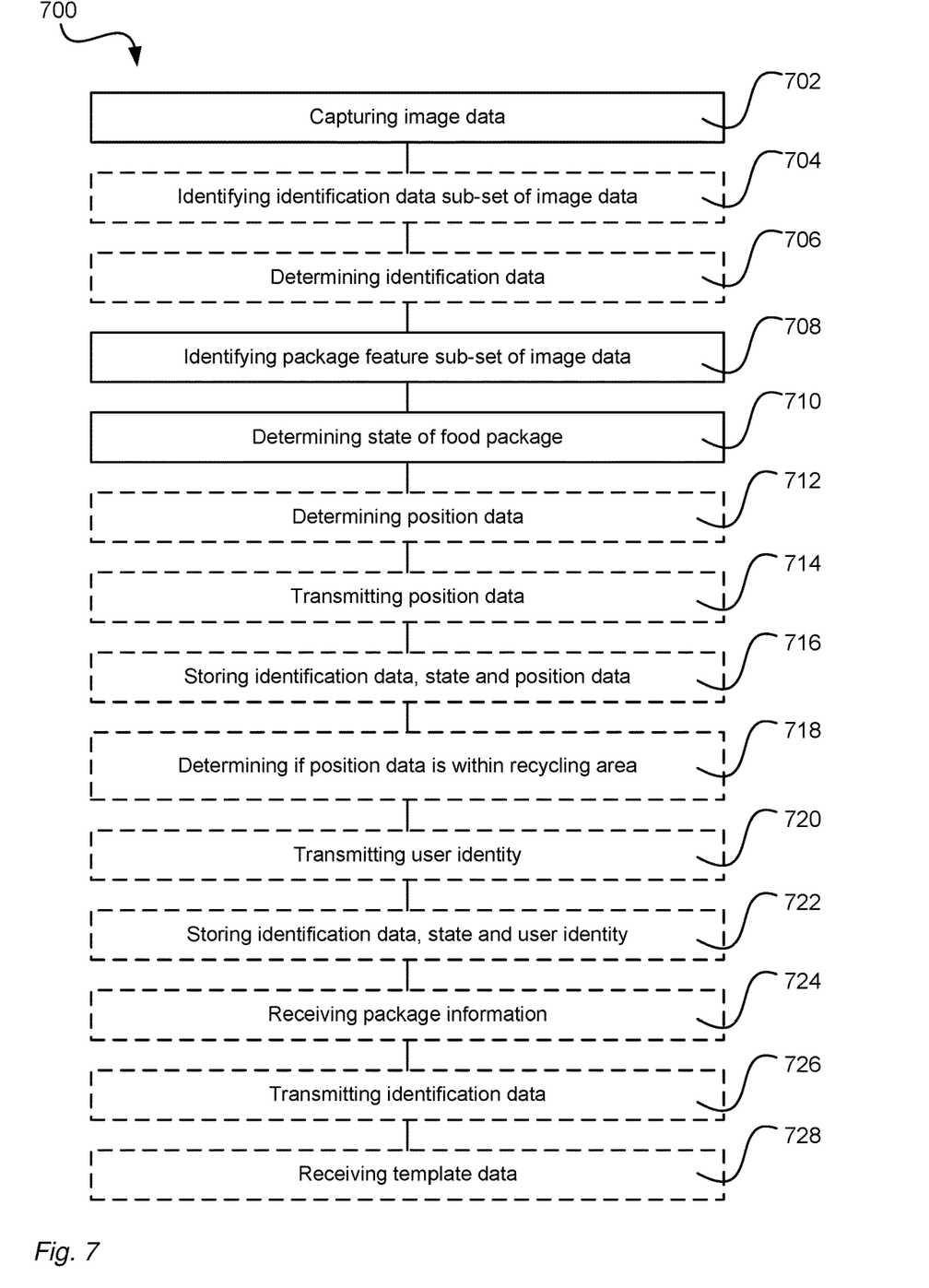
FIG. 7 is a flow chart illustrating steps of a method for identifying a state of a food package by using a camera.

FIG. 7 is a flow chart illustrating steps of a method for identifying consumption of the food product held in the food package 100, 200, 300, 500 by using the mobile device 400.

In a first step 702, image data 606 depicting a section 102, 202, 302, 502 of the food package can be captured by using a camera 402 of the mobile device 400. As presented above, the section 102, 202, 302 can comprise a printed code 104, 204, 304, 504 and an opening device 106, 206, 306, 506.

Optionally, in a second step 704, an identification data sub-set 108, 208, 308, 508 of the image data 606 depicting the printed code 104, 204, 304, 504 can be identified.

Optionally, in a third step 706, identification data 608 can be determined based on the identification data sub-set 108, 208, 308, 508 of the image data 606.

In a fourth step 708, a package feature sub-set 110, 210, 310, 510 of the image data 606 depicting the package features 106, 206, 306, 506, can be identified.

In a fifth step 710, a state of the package 100, 200, 300, 500 based on the package feature sub-set 110, 210, 310 of the image data 606 can be determined. The state may be selected from a group consisting of a food holding state and an emptied state.

Optionally, according to a sixth step 712, position data 612 can be determined by using the mobile device 400, and, according to a seventh step 714, the position data 612 may be transmitted to the server 602, and, according to an eighth step 716, the identification data 608, the state of the package and the position data 612 may be stored on the server 602.

Optionally, according to a ninth step 718, it can be determined if the position data 612 is within the recycling area or not. In case the mobile device 400 is not within the recycling area, that is, not close to the recycling bin, it may be decided that no recycling is taking place. As described above, the position data 612 may be determined by having the mobile device 400 GPS-enabled, but also in that the mobile device is NFS-enabled and that the recycling bin is provided with a NFC transponder.

Optionally, according to a tenth step 720, the user identity 618 can be transmitted to the server 602, and according to an eleventh step 722 the identification data 508, the state of the package and the user identity 618 can be stored on the server 602.

Optionally, in an twelfth step 724, the package information 616 related to the identification data 508 from the server 502 can be received.

The first step 702, the second step 704, the third step 706, the fourth step 708 and the fifth step 710 may be performed in the server 602.

Alternatively, in a thirteenth step 726, the identification data 508 can be transmitted to the server 502, and, according to a fourteenth step 728, the template data 510 related to the identification data 508 can be received from the server 502, wherein the template data 510 is taken into account in the step of determining 710 the state of the package, e.g. as explained above.

Even though described in a certain order, the different steps may also be performed in other orders.

Figure 8:
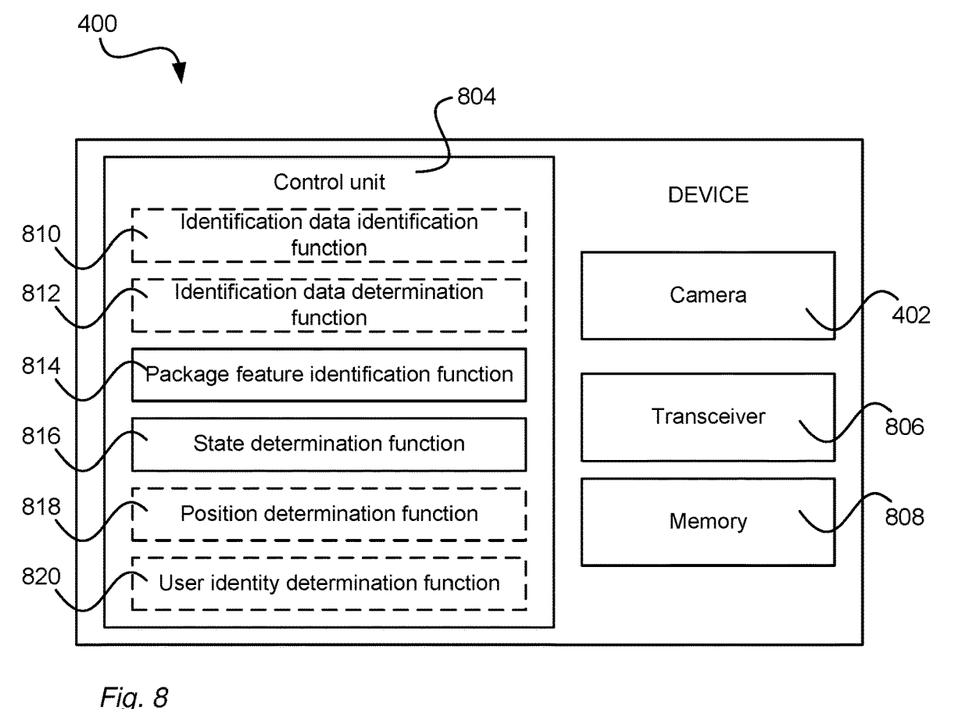
FIG. 8 schematically illustrates the device configured to identify the state of the food package.

FIG. 8 illustrates the mobile device 400 configured to identify the state of the food package 100, 200, 300, 500 according to a first example. As described and illustrated in FIG. 4, the mobile device 400 may be equipped with the camera 402.

For handling data, the mobile device 400 may comprise a control unit 804, such as a processor, a transceiver 806 for transmitting and receiving data, and a memory 808 for storing the data.

Optionally, the control circuit 804 can be configured to execute an identification data identification function 810 configured to identify an identification data sub-set 108, 208, 308, 508 of the image data 606 depicting the printed code 104, 204, 304, 504. Further, it may be configured to execute an identification data determination function 812 configured to determine identification data 608 based on the identification data sub-set 108, 208, 308, 508 of the image data 606.

The control circuit 804 may be configured to execute a package feature identification function 814 configured to identify a package feature sub-set 110, 210, 310, 510 of the image data depicting the package 100, 200, 300, 500. It may be configured to execute a state determination function 816 configured to determine a state of the package based on the package feature sub-set of the image data. The state may be selected from a group consisting of the food holding state and the emptied state.

The control circuit 804 may also be configured to execute a position determination function 818 configured to determine the position data 612 by using the mobile device 400, which may be GPS equipped or NFC-enabled, and the transceiver 806 may be configured to transmit the position data 612 to the server 602.

The control circuit 804 may further be configured to execute a user identity determination function 820 configured to determine the user identity 618, wherein the transceiver 806 can further be configured to transmit the user identity 618 to the server 602.

Figure 9:
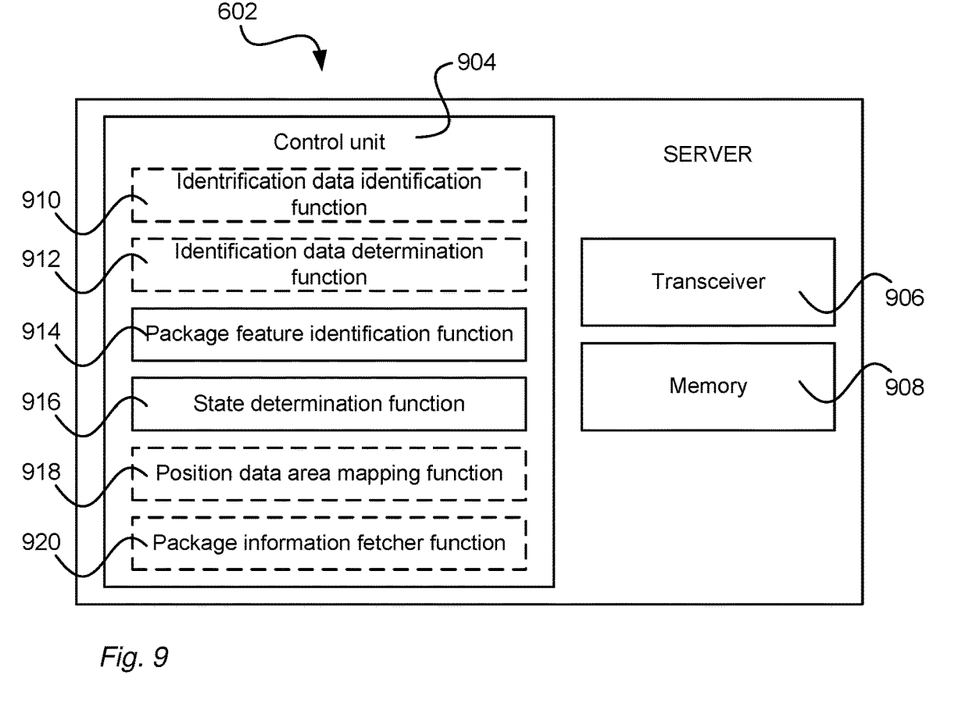
FIG. 9 schematically illustrates the server configured to identify the state of the food package.

FIG. 9 illustrates the server 602 configured to identify consumption of the food product held in the food package 100, 200, 300 according to a second example.

The server 602 may comprise a transceiver 906 configured to receive the image data 606 depicting the section 102, 202, 302, 502 of the food package from the mobile device 400, wherein the section 102, 202, 302 can comprises at least one package feature 106, 206, 306, 506, 512-544, and optionally also the opening device 106, 206, 306, 506 and/or the printed code 104, 204, 304, 504.

Further, the server 602 may comprise a control circuit 904 configured to execute an identification data identification function 910 configured to identify the identification data sub-set 108, 208, 308, 508 of the image data 606 depicting the printed code 104, 204, 304, 504, an identification data determination function 912 configured to determine the identification data 608 based on the identification data sub-set 108, 208, 308, 508 of the image data 606, a package feature identification function 914 configured to identify the package feature sub-set 110, 210, 310, 510 of the image data 606 depicting the opening device 106, 206, 306, 506 and a state determination function 916 configured to determine the state of the opening device 106, 206, 306, 506 based on the second sub-set 110, 210, 310, 510 of the image data 606, wherein the state may be selected from the group consisting of the food holding state or the emptied state.

Further, the transceiver 906 may further be configured to receive the position data 612, and the control circuit 904 may further be configured to execute a position data area mapping function 918 configured to determine if the position data 612 is within the recycling area or not.

The control unit 904 may also be configured to execute a package information fetcher function 920 configured to fetch the package information related to the identification data 608. The transceiver 906 may further be configured to transmit the package information 616 to the mobile device 400.

The first example illustrated in FIG. 8 is linked to the mobile device 400 illustrated in FIG. 6A, that is, in this example the package 100, 200, 300, 500 is identified by the mobile device 400 and the identification data 508 is transmitted to the server 504. The second example illustrated in FIG. 9 is linked to the server 602 illustrated in FIG. 6B. In the example illustrated in FIG. 6B, the image data 606 can be captured by the mobile device 400, but the identification data can be extracted by the server 602.

As stated above, it may be determined whether the package is in the food holding state or the emptied state. The food holding state may be defined as a state in which the opening device of the package is closed and the package is folded such that a closed space is formed inside the package. The emptied state may be defined as a state in which the package is folded flat and optionally the opening device is opened.

Figure 10:
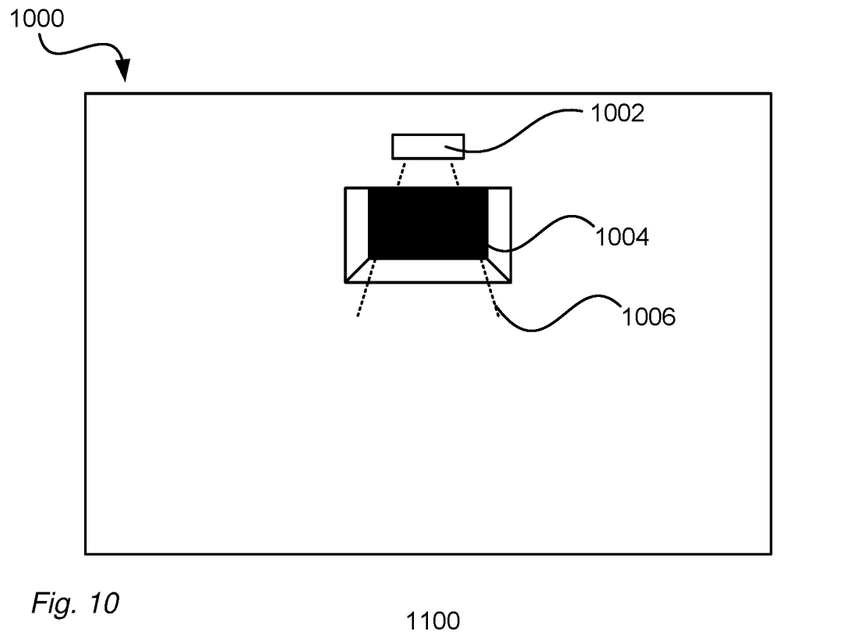
FIG. 10 illustrates the device embodied as a bin equipped with the camera.

Even though the device above is exemplified as the mobile device 400 above, the device may be embodied in different ways. For instance, the device may be a bin 1000 provided with a camera 1002 as illustrated in FIG. 10. As illustrated in the example presented in FIG. 10, the bin 1000 may be provided with an opening 1004 for receiving the package 100, 200, 300, 500. Above the opening 1004, the camera 1002 may be provided such the image data 606 can be captured in connection to placing the package in the bin 1000. Even though not illustrated, a display may be provided on the bin 1000 such that the package information and also information on remuneration linked to placing the package in the bin can be displayed. As an alternative, this information may be provided on the mobile phone of the user. The mobile phone and the bin may be linked to each other using NFC communication and/or position data.

Figure 11:
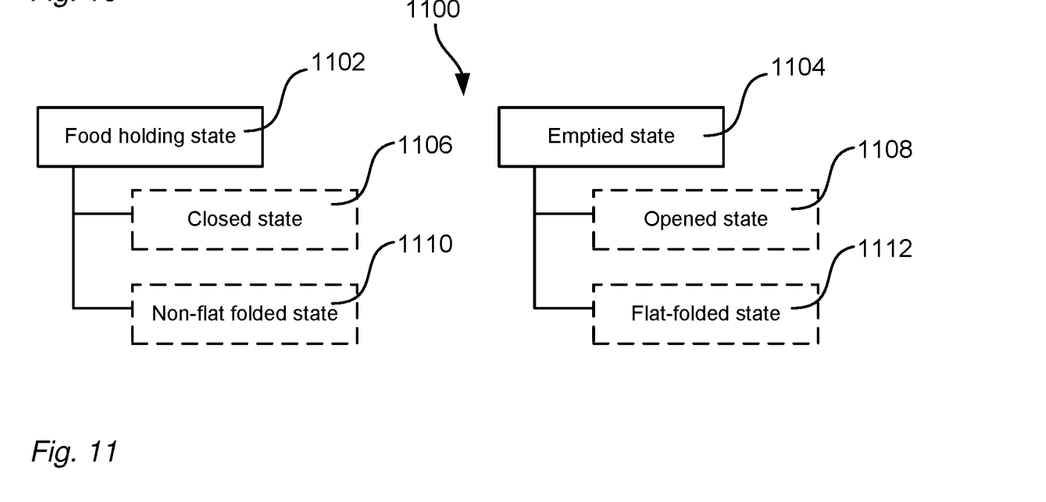
FIG. 11 schematically illustrates how the two states, food holding state and emptied state, can be related to different sub-states.

FIG. 11 illustrates schematically the state 1100 of the package 100, 200, 300, 500. More particularly, it is illustrated how the food holding state 1102 and the emptied state 1104 can be linked to different sub-states. For instance, the food holding state 1102 may be linked to a closed state 1106 of the opening device 106, 206, 306, 506, that is, if the opening device is closed this may indicate that the package is in the food holding state 1102. The emptied state 1104 may be linked to the opened state 1108, that is, in case the opening device is opened, this may indicate that the package is in the emptied state 1104. Further, by using e.g. the weakening lines described above, a non-flat folded state 1110 may be identified. In case the package is determined to be in the non-flat folded state 1110, this may indicate that the package is in the food holding state 1102. However, in case the package is determined to a flat folded state 1112, this may be an indication that the package is in the emptied state 1104. The more indications pointing towards a certain state, the higher likelihood that that the package is in this certain state. The sub-states exemplified above may be complemented or replaced by other sub-states for identifying whether the package is in the food holding state or in the emptied state. Further, different types of packages may use different types of sub-states. The sub-states presented above are examples of sub-states that may be used for carton packages.

From the description above follows that, although various embodiments of the invention have been described and shown, the invention is not restricted thereto, but may also be embodied in other ways within the scope of the subject-matter defined in the following claims.

The invention claimed is:

1. A method for identifying a state of a food package by using a camera, said method comprising:
   capturing image data depicting a section of the food package by using the camera, wherein the section comprises at least one package feature and a printed code,
   identifying an identification data sub-set of the image data depicting the printed code,
   determining identification data based on the identification data sub-set of the image data
   transmitting the identification data to a server, receiving template data related to the identification data from the server, identifying a package feature sub-set of the image data depicting the at least one package feature provided in the section, and determining the state of the food package based on the template data and the package feature sub-set of the image data, wherein the state is selected from a food holding state in which an opening device of the package is closed and the package is folded such that a closed space is formed inside the package, and an emptied state in which the package is folded flat and optionally the opening device is opened.

2. The method according to claim 1, further comprising:
determining position data by using a food package state identification device,
transmitting the position data to a server, and
storing the identification data, the state of the package and the position data on the server.

3. The method according to claim 2, further comprising:
determining if the position data is within a recycling area.

4. The method according to claim 3, wherein the food package state identification device is associated with a user identity, and the method further comprising:
transmitting the user identity to the server, and
storing the identification data, the state of the package and the user identity on the server.

5. The method according to claim 1, wherein the at least one package feature comprises an opening device, and the emptied state comprises a state that the opening device is in an opened state.

6. The method according to claim 1, wherein the at least one package feature comprises at least one weakening line, and the emptied state comprises a state that the package is in a flat-folded state.

7. The method according to claim 1, wherein the printed code is a unique two-dimensional code.

8. The method according to claim 1, wherein capturing the image data depicting the section of the food package, identifying the identification data sub-set of the image data, determining the identification data based on the identification data sub-set, identifying the package feature sub-set of the image data depicting the at least one package feature, and determining the state of the food package based on the package feature sub-set of the image data are performed on a server.

9. A device configured to identify a state of a food package, said device comprising:

a camera configured to capture image data depicting a section of the food package, wherein the section comprises at least one package feature and a printed code, a control circuit configured to:
identify a package feature sub-set of the image data depicting the at least one package feature,
identify an identification data sub-set of the image data depicting the printed code, and
determine identification data based on the identification data sub-set of the image data,
wherein the device further comprising a transceiver configured to transmit the identification data to a server, and receive template data related to the identification data from the server,
wherein the control circuit is further configured to determine the state of the food package based on the template data and on the package feature sub-set of the image data, wherein the state is selected from a group consisting of a food holding state in which an opening device of the package is closed and the package is folded such that a closed space is formed inside the package and an emptied state in which the package is folded flat and optionally the opening device is opened.

10. The device according to claim 9, wherein the device comprises a camera equipped mobile device or a camera equipped bin.

11. A server configured to identify a state of a food package, said server comprising:
a transceiver configured to receive image data depicting a section of the food package from a device, wherein the section comprises at least one package feature and a printed code, and
a control circuit configured to:
identify a package feature sub-set of the image data depicting the at least one package feature,
identify an identification data sub-set of the image data depicting the printed code,
determine identification data based on the identification data sub-set of the image data, and
determine the state of the food package based on template data related to the identification data and on the package feature sub-set of the image data, wherein the state is selected from a group consisting of a food holding state in which an opening device of the package is closed and the package is folded such that a closed space is formed inside the package and an emptied state in which the package is folded flat and optionally the opening device is opened.

* * * * *